United States Patent [19]
Spendlove

[11] Patent Number: 5,202,169
[45] Date of Patent: Apr. 13, 1993

[54] RELEASABLE FASTENER, METHOD OF RELEASABLY FASTENING, AND RELEASABLE FASTENER DISPENSER

[76] Inventor: Max J. Spendlove, 13121 Clifton Rd., Silver Spring, Md. 20904

[21] Appl. No.: 644,971

[22] Filed: Jan. 23, 1991

[51] Int. Cl.$^5$ ............................................. B65D 65/28
[52] U.S. Cl. .................... 428/43; 428/131; 428/194; 428/211; 428/343; 428/354; 24/67 R; 24/67 AR; 281/21.1; 412/37; 412/38; 412/901
[58] Field of Search ............... 428/43, 194, 211, 906, 428/40, 42, 343, 354, 131; 24/DIG. 11, 67 R, 67 AR, 67.9, 67.11; 206/460, 820, 813, 411, 389, 395; 281/28, 21.1, 23; 156/908; 402/500

[56] References Cited

U.S. PATENT DOCUMENTS

| | | | |
|---|---|---|---|
| 219,582 | 9/1879 | Holmes | 281/23 |
| 341,005 | 5/1886 | Heysinger | 281/21.1 |
| 470,383 | 3/1892 | Lynch | 24/67 AR |
| 699,065 | 4/1902 | Barth | 24/67 R |
| 952,642 | 3/1910 | Robertson | 281/21.1 |
| 957,447 | 5/1910 | Suddick | 24/67 R |
| 1,102,370 | 7/1914 | Wait | 24/67 AR |
| 1,250,016 | 12/1917 | Richards | 24/67 R |
| 1,291,382 | 1/1919 | Bohan | 24/67 R |
| 1,793,328 | 2/1931 | Bombard | 24/DIG. 11 |
| 2,030,135 | 2/1936 | Carpenter | 24/67 AR |
| 2,142,194 | 1/1939 | Karfiol | 206/460 |
| 2,170,147 | 8/1939 | Lane | 206/447 |
| 2,173,972 | 9/1939 | Lane | 24/17 R |
| 2,292,176 | 8/1942 | Tate | 16/225 |
| 2,510,263 | 6/1950 | Stein | 281/21.1 |
| 2,547,487 | 4/1951 | Penney | 24/67 R |
| 2,931,747 | 4/1960 | Dexter | 428/57 |
| 3,212,505 | 10/1965 | Toman | 281/21.1 |
| 3,443,288 | 5/1969 | Batchelder | 24/67 AR |
| 3,884,443 | 5/1975 | McMaster | 24/67 AR |
| 4,300,268 | 11/1981 | Wilson | 24/67 R |
| 4,917,929 | 4/1990 | Heinecke | 428/43 |

FOREIGN PATENT DOCUMENTS 774  6/1887  Sweden ............................. 281/21.1

Primary Examiner—Ellis P. Robinson
Assistant Examiner—Nasser Ahmad
Attorney, Agent, or Firm—Burns, Doane, Swecker & Mathis

[57] ABSTRACT

A releasable fastener, a method of fastening together a number of pieces of paper, and a dispenser carrying a supply of releasable fasteners are disclosed. In a first embodiment, a releasable fastener is disclosed which includes a first portion having front and back oppositely-facing sides which are substantially covered with an adhesive, and a second portion having front and back oppositely-facing sides which ar free of adhesive. A releasable fastener dispenser carrying a supply of releasable fasteners is also disclosed which includes a strip of carrier material, and a plurality of releasable fasteners releasably adhered to the strip of carrier material.

16 Claims, 1 Drawing Sheet

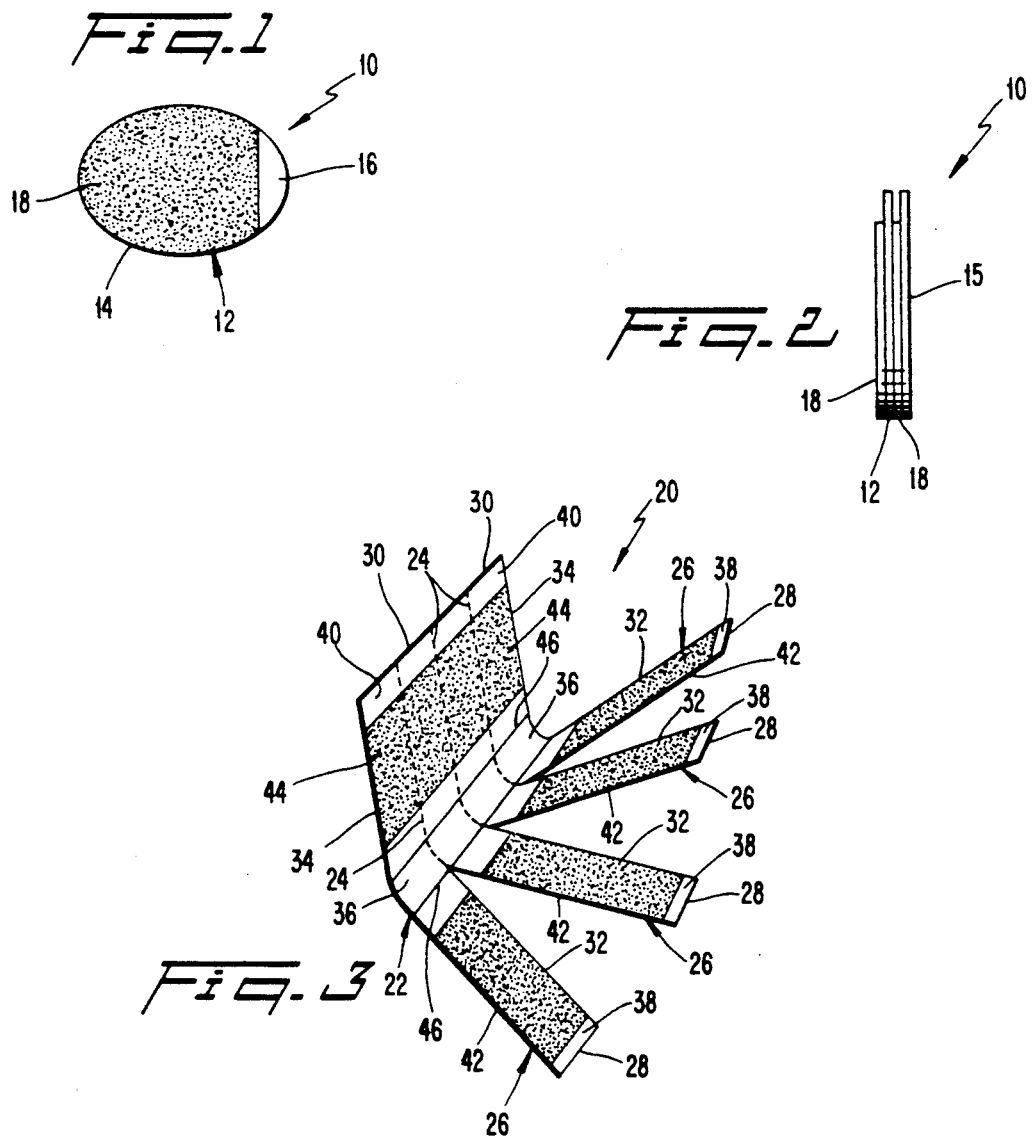
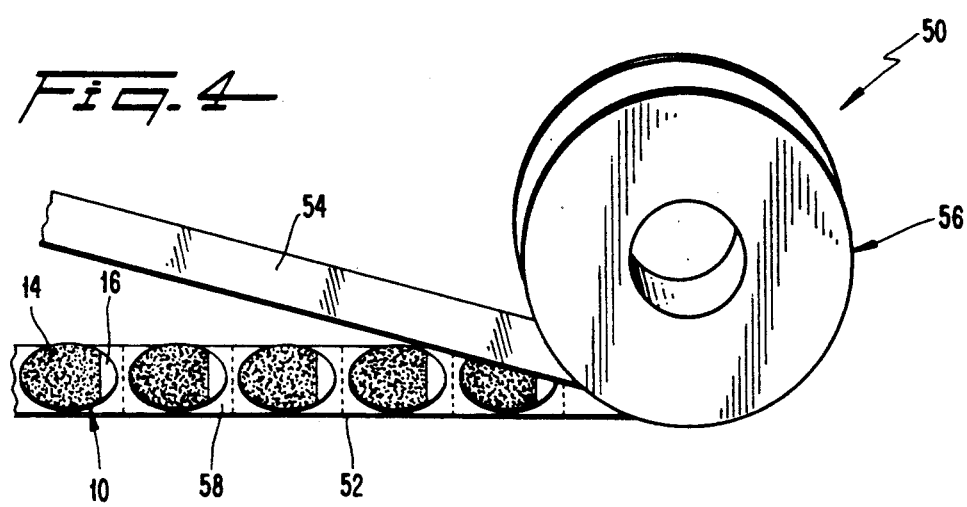

RELEASABLE FASTENER, METHOD OF RELEASABLY FASTENING, AND RELEASABLE FASTENER DISPENSER

BACKGROUND OF THE INVENTION

1. Field of the Invention

The present invention relates to releasable fasteners. More particularly, the present invention relates to releasable fasteners for releasably fastening together a plurality of pieces of paper.

2. Description of the Related Art

Various types of fasteners have been developed in the prior art to fasten together pieces of material such as paper or cloth. Some of those fasteners include two separate pieces of material which are fastened together. For example, U.S. Pat. No. 2,510,263 to Stein discloses a binder file tape which includes a support strip 21 coated with an adhesive 22 for attachment to a folder 17, and a tab strip 23 which is also coated with an adhesive 25 on one side for attachment to the support strip 21, and which is cut into mounting tabs 24 which are each adherable to a leaf 29 to mount a plurality of leaves in the folder 17.

Also, U.S. Pat. No. 2,931,747 to Dexter discloses a fabric fastener 1 which includes two strips 2, 3 of material which each have a coating 4, 5, respectively, of adhesive thereon so that the strips 2, 3 may adhere to each other and to two pieces of fabric to fasten together the pieces of fabric. Unfortunately, fasteners which include two separate pieces of material have the disadvantage that they are relatively difficult and costly to manufacture, and are thus relatively expensive.

Another type of fastener for sheet material has been developed which includes only a single sheet of adhesive material U.S. Pat. No. 2,547,487 to Penney discloses an adhesive tab which includes a material engaging member 10 having an adhesive coating 11 fixed on only one side thereof to which is removably affixed a pair of covers 12, 13. When a user desires to fasten two sheets 18, 19 together, he or she must remove the covers from the coating 11, and press the tab on the sheets 18, 19. A disadvantage of this type of fastener, however, is that the need to remove a pair of covers from an adhesive coating makes the fastener relatively time consuming and bothersome to use.

Other fasteners have been developed in the prior art which include only a single piece of material and which are free of adhesive covers. For example, U.S. Pat. No. 2,292,176 to Tate discloses a hinge mount which is made of a strip of material 10 which has a crease line 12 along its longitudinal median, an adhesive on one side thereof, and transverse score lines 20 thereacross. The strip 10 is severed along a transverse score line 20 to form a desired length, and is then folded along the crease line 12. The strip 10 is then fastened to a card along the edge of the card, and is fastened to a page of an album to secure the card in the album.

U.S. Pat. No. 1,250,016 to Richards discloses a leaf binder which is in the form of a strip 2 which has an adhesive on one side thereof. The strip 2 includes a plurality of shanks 15 which are bendable upwardly from the strip 2. In use, the strip 2 is attached to a cover element C, and the shanks 15 are attached to both leaves I', I'' of a sheet I. The sheet I is thereby fastened into the cover C.

U.S. Pat. No. 952,642 to Robertson discloses a loose leaf binding hinge made of a strip A of material which has an adhesive on an underside thereof and which has two sets of tabs 10, 11 cut and folded outwardly therefrom. In use, the strip A is adhered to a cover C, and the tabs 10, 11 are adhered to a loose leaf B to fasten the loose leaf B to the cover C.

Also, U.S. Pat. No. 341,005 to Heysinger discloses a binding strip A for papers. The strip A includes an adhesive on one side C thereof, a solid portion a for attachment to the lower surface of a bottom sheet, and a plurality of flaps B for attachment to upper surfaces of a plurality of upper sheets. The bottom sheet and the upper sheets are thereby all bound together.

U.S. Pat. No. 1,291,382 to Bohan discloses a binding clip for sheet music, which includes two end portions 10, 10 having an adhesive on one side thereof, and a connecting neck portion 11 having an adhesive on an opposite side thereof. In use, the clip is folded along a line 18, and the end portions 10, 10 are adhered to either side of a central sheet 17. The clip is then cut into two pieces along line 18, and the resulting separate neck portions 11, 11 are adhered to outer faces of cover sheets 15 to attach the central leaf 17 to the cover sheets 15.

Each of the above-described single piece fasteners have several disadvantages. For example, each of these fasteners must be folded over around an edge of at least one sheet to properly fasten two or more sheets together. These fasteners thus require relatively exact placement on a sheet to ensure that two sheets align correctly when they are fastened. As a result, they are relatively time-consuming to use due to their need to be folded and exactly placed. Also, they are limited to being only able to fasten sheets at the sheets edges. Further, in the case of the fasteners which fasten more than two sheets together, such as disclosed in the Richards and Heysinger patents, the fasteners adhere to one side only of each sheet, and thus form relatively unstable attachments to each of the sheets.

SUMMARY OF THE INVENTION

In view of the above, it is an object of the present invention to provide a releasable fastener which is relatively easy and quick to use.

A further object of the present invention is to provide a releasable fastener which does not require folding or exact placement to fasten pieces of material together.

It is a further object of the present invention to provide a releasable fastener which is relatively inexpensive and easy to manufacture.

It is a further object of the present invention to provide a releasable fastener which can achieve a relatively stable attachment to a plurality of sheets.

Another object of the present invention is to provide a relatively easy and quick method of releasably fastening together at least two pieces of paper.

Yet another object of the present invention is to provide a releasable fastener dispenser which carries a supply of releasable fasteners in a compact manner such that they are easily removed from the dispenser.

The above objects, as well as other objects not specifically enumerated, are accomplished by a releasable fastener for releasably fastening together two pieces of paper according to the present invention. The releasable fastener, according to the present invention, comprises a substantially planar piece of base material, which includes means for releasably adhering the pieces of paper to the base material piece. The adhering means includes a first portion of the base material piece which has front and back oppositely-facing sides thereon which are each substantially covered with a releasable adhesive. The base material piece further includes mean for releasing the base material piece from the pieces of paper, the releasing means including a second portion of the base material piece which has front and back oppositely-facing sides thereon which are free of adhesive.

The objects of the invention are also accomplished by a fastener which includes a piece of base material, wherein the base material piece includes one or more interleaving portions having front and back oppositely-facing sides which are each substantially covered with an adhesive and at least one cover portion having front and back oppositely-facing sides, wherein the back side of the cover portion is substantially covered with an adhesive and the front side of the cover portion is free of adhesive.

The objects of the present invention are further accomplished by a method of releasably fastening together two pieces of paper, which includes the steps of providing a releasable fastener which includes a substantially planar piece of base material having a first portion having front and back oppositely-facing sides thereon which are both substantially covered with an adhesive, and a second portion having front and back oppositely-facing sides thereon which are both free of adhesive, grasping the front and back sides of the second portion, placing the releasable fastener on a first piece of paper such that the back side of the first portion adheres to the first piece of paper, and placing a second piece of paper on the releasable fastener such that the front side of the first portion adheres to the second piece of paper.

The objects of the present invention ar also accomplished by a method of fastening a number of pieces of paper together, which includes the steps of separating a fastener which includes a number of patches from a fastener strip, wherein each of the patches includes an interleaving portion which has front and back oppositely-facing sides which are substantially covered with an adhesive, and a cover portion which has front and back oppositely-facing sides, and wherein the front side of the cover portion is substantially covered with a adhesive and the back side of the cover portion is free of adhesive, and attaching the interleaving portions of the patches to the pieces of paper such that the pieces of paper are each fastened to the fastener and are movable relative to each other.

The objects of the present invention are further accomplished by a releasable fastener dispenser carrying a supply of releasable fasteners, which includes a first strip of carrier material, and a plurality of releasable fasteners, each of the releasable fasteners including a substantially planar piece of base material which includes a first portion having front and back oppositely-facing sides thereon which are both substantially covered with an adhesive, and a second portion having front and back oppositely-facing sides thereon which are free of adhesive, wherein the adhesive is more adherent to the base material than to the carrier material, and wherein the releasable fasteners are thereby releasably adhered to the first strip of carrier material by the adhesive.

BRIEF DESCRIPTION OF THE DRAWINGS

The preferred embodiments of the present invention will be described in greater detail with reference to the accompanying drawings, wherein like members bear like reference numerals and wherein:

FIG. 1 is a top view of a first embodiment of a releasable fastener of the present invention;

FIG. 2 is a modified version of the fastener of FIG. 1;

FIG. 3 is a perspective view of a second embodiment of the releasable fastener of the present invention; and FIG. 4 is a perspective view of a releasable fastener dispenser carrying a supply of releasable fasteners in accordance with the present invention.

DETAILED DESCRIPTION OF THE PREFERRED EMBODIMENTS

With reference to FIG. 1, a first embodiment 10 of a releasable fastener of the present invention is shown from a front side thereof. It is to be understood that the back, opposite side of the fastener 10 may be made substantially identical to the front side. The fastener 10 is composed of a substantially planar piece of base material 12 which includes a first portion 14 having front and back oppositely-facing sides thereon, and a second portion 16 also having front and back oppositely-facing sides thereon. In FIG. 1, only the front sides of the first and second portions 14, 16 can be seen.

The front and back oppositely-facing sides of the first portion 14 are covered with an adhesive 18, while the front and back oppositely-facing sides of the second portion 16 are free of adhesive. The adhesive 18 is preferably releasable and is thus more adherent to the base material piece 12 than to a material to which the fastener 10 is designed to be fastened. The fastener 10 is preferably for use in releasably fastening together pieces of paper, and the adhesive 18 is thus preferably chosen and applied in a manner such that it is more adherent to the base material piece 12 than to the pieces of paper which are to be releasably fastened. In addition, the adhesive is preferably of a type which will adhere to paper when it is pressed against the paper, but which will also peel easily off of the paper without tearing the paper when a peeling force is applied to the fastener 10.

In use, two pieces of material, such as pieces of paper, can be releasably fastened together by the releasable fastener 10 in a quick and easy manner. First, a user need only pick up a releasable fastener 10 by grasping the front and back oppositely-facing sides of the second portion 16. The user next places the releasable fastener 10 on a first piece of paper such that the back side of the first portion 14 adheres to the first piece of paper while the back side of the second portion 16 remains free of adhesion with the first piece of paper. The user then places a second piece of paper on the releasable fastener such that the front side of the first portion 14 releasably adheres to the second piece of paper while the front side of the second portion 16 remains free of adhesion with the second piece of paper. The first and second pieces of paper ar thereby releasably fastened together by the first portion 14, which forms means for releasably adhering the pieces of paper to the base material piece 12.

Thus, the releasable fastener allows two pieces of material to be fastened together quickly and easily, without requiring exact placement of the fastener 10 along an edge of one of the pieces of material. The fastener 10 can be placed anywhere on the pieces of material, and releasable fastening will be achieved. Also, inherent in the simplicity of the fastener 10 is the fact that the fastener 10 is inexpensive and easy to manufacture.

If desired, the fastener 10 can be placed between the two pieces of paper so that the nonadhesive second portion 16 protrudes out from between the two pieces of paper. The protruding portion 16 can be used for an index tab, and can be written on or color coded for identification. Also, it can be used for fastening purposes, e.g., a thumb tack can be put through the protruding portion 16 without damaging the two pieces of paper that are adhered together.

If the user later desires to separate the pieces of paper from each other, the user need only grasp the front and back sides of the second portion 16, if it is protruding from between the two pieces of paper, and peel the pieces of paper from the releasable fastener 10. Alternatively, the user can first peel the papers apart, and then remove the fastener 10 from whichever of the pieces of paper the fastener 10 adheres to by grasping the second portion 16 and peeling the fastener 10 from the piece of paper. In either case, the second portion 16 serves as a means for releasing the base material piece 12 from the pieces of paper.

The releasable fastener 1? is shown in FIG. 1 as being oval-shaped, but the fastener 10 may of course be square, circular, rectangular, diamond-shaped, or almost any other shape, and advantages obtained therefrom. Also, the second portion 16 of the releasable fastener 10 is shown as being located adjacent a boundary of the base material piece 12 so that it is easy for a user to pick up the fastener 10 by grasping the second portion 16, but the second portion could be located anywhere on the base material piece, and some advantages obtained therefrom. Further, the boundary between the first portion 14 and the second portion 16 is shown as being defined by a line, but an arc or other boundary could be advantageously used. Also, as indicated above, the base material piece 12 may be color coded or carry printing thereon if desired. It should be further noted that the base material piece 12 may be made of any thin, strong, flexible material, such as paper, cloth, plastic, or other materials.

Further, the fastener 10 could be made with a permanent adhesive which permanently adheres to materials such as paper. In such an embodiment, the fastener could still include a second portion free of adhesive to allow a user to grasp the fastener without touching the adhesive, and the adhesive could still be located on front and back sides of a first portion of the fastener.

In FIG. 2, a further refinement of the embodiment of FIG. 1 is illustrated. A side view of the fastener 10 illustrates the layers of adhesive 18 on opposite sides of the first portion 14. However, as illustrated in FIG. 2, a second layer of material 15 may be applied to the adhesive 13 on one side of the base material 12. The second layer 15 preferably is the same size and shape as the base material 12, but could be limited to the size of the first portion 14. Alternatively, the second layer 15 may even be larger than the base material 12. The second layer 15 may be made out of different materials, such as paper or wax paper.

The base material 12 may be applied to one sheet of paper while the second layer 15 is retained on the base material 12. The second layer 15 may be left on the fastener 10 so that notes may be written on it. Or, it can be removed at any time for fastening a second piece of paper to the one sheet of paper.

With reference to FIG. 3, a second embodiment 20 of the releasable fastener of the present invention is composed of an elongated strip or piece of base material 22 which has a plurality of perforated lines 24 extending thereacross such that the fastener 20 is divided into a plurality of patches 26. Each of the patches 26 includes a first edge 28 on one end of the patch, and a second edge 30 on an opposite end of the patch. Additionally, each patch 26 includes, in the following order between the first edge 28 and the second edge 30, a first pull tab portion 38, an interleaving portion 32, a folding or spacing portion 36, a cover portion 34, and a second pull tab portion 40.

The interleaving portion 32 of each patch 26 includes front and back oppositely-facing sides (only the front sides are shown in FIG. 3) which are covered with an adhesive 42, and the cover portion 34 of each patch 26 also includes front and back oppositely-facing sides, wherein the back side of the cover portion 34 is covered with an adhesive 44, and the front side (not shown) of the cover portion 34 is free of adhesive. The folding or spacing portion 36 and the first and second pull tab portions 38, 40 of each patch 26 each include front and back oppositely-facing sides which are free of adhesive. Also, the folding or spacing portion 36 of each patch 26 includes at least one fold or score line 46 which extends thereacross to facilitate bending of the base material piece 22.

As with the fastener 10, the adhesives 42, 44 of the fastener 20 are preferably more adherent to the base material piece 22 than to a piece of material which the fastener 20 is designed to releasably fasten. Therefore, if the fastener 20 is designed to fasten a plurality of pieces of paper together, the adhesives 42, 44 are chosen and applied to the base material piece 22 in a manner such that the adhesives 42, 44 are more adherent to the base material piece 22 than to pieces of paper which the fastener 20 releasably fastens together. Also, the adhesives 42, 44 are of a type which will quickly and easily adhere to a piece of material such as paper, but which will also easily peel away from the piece of material without tearing the material when a peeling force is applied to the fastener 20.

In use, the releasable fastener 20 of FIG. 3 will normally be produced as a continuous strip, and will be cut into long fastener strips which each include a predetermined, relatively large number of patches 26 separated by perforated lines 24. A user severs the releasable fastener 20 from a fastener strip by cutting or tearing the fastener strip along one of the perforated lines 24. The exact location of the perforated line 24 along which the user cuts or tears will be determined by the user based on the number of patches needed in the releasable fastener 20 Generally, the number of patches needed will be one less than the number of pieces of paper which the user desires to releasably fasten together.

The user then can partially sever each of the perforated lines 24 extending across the fastener 20 by cutting or tearing the base material piece 22 along the perforated lines 24 from the first edge 28 up to the folding or spacing portions 36, such that the interleaving portions 32 of the fastener 20 are separated from each other. The interleaving portions 32 can then each be attached one-by-one to edge portions of pieces of paper, with the front and back oppositely-facing sides of the interleaving portions 32 each attached to a piece of paper. Once this has been accomplished, the pieces of paper are moveable relative to each other and are arranged in a stack with each interleaving portion 32 attached to two pieces of paper. The releasable fastener 20 thus has the advantage that it forms very stable attachments with each sheet of paper in the stack, since each sheet is fastened on both of its sides by the fastener 20.

To further secure the stack of papers, the folding or spacing portions 36 can be bent over the edge of the stack (preferably along the at least one score line 46), and the back sides of the cover portions 34 can be adhered to an outer surface of an outermost piece of paper on the stack. Since the front and back sides of the first and second pull tab portions 38, 40 of each patch 26 are free of adhesive, the first and second pull tab portions 38, 40 essentially form pull tab means which a user may hold to manipulate the interleaving and cover portions 32, 34 into place during releasable fastening, without touching any adhesive.

It is to be understood that various modifications may be made to the second embodiment of the releasable fastener, and advantages obtained therefrom. For example, the interleaving and cover portions 32, 34 of the fastener 20 are shown as being always uncovered, but they may if desired be manufactured with removable films thereon to protect them against premature or accidental adhesion. In such a case, a user would have to remove the films from the interleaving and cover portions 32, 34 before adhering them to pieces of paper.

Also, the base material piece 22 may be made of any thin, strong, flexible material, such as paper, cloth, plastic, or other materials. If desired, the first and second pull tab portions of the releasable fastener 20 may be eliminated, and advantages still obtained therefrom. Also, the fastener strips may be advantageously sold to the user with the perforated lines 24 already partially severed. Further, the fastener may be advantageously made with a permanent adhesive thereon, rather than with a releasable adhesive. In such a case, the adhesive would be of a type which permanently bonds with a material such as paper.

With reference to FIG. 4, a releasable fastener dispenser 50 which carries a supply of releasable fasteners 10 of the present invention will be described. The releasable fastener dispenser 50 includes a first strip of carrier material 52 and a second strip of carrier material 54. A supply of the releasable fasteners 10 are carried between the carrier material strips 52, 54 such that the adhesive on the front and back oppositely-facing sides of the first portions 14 of the fasteners 10 adheres to the carrier material strips 52, 54.

The adhesive of the fasteners 10 is more adherent to the base material of the fasteners 10 than the carrier material of the strips 52, 54, such that the fasteners 10 will peel away from the carrier material strips 52, 54 without tearing the strips 52, 54. Also, the fasteners 10 are arranged on the strips 52, 54 such that they are spaced from each other, and the strips 52, 54 are arranged in a roll 56 for compact packaging and storage.

It should be recognized that, if desired, the second carrier material strip 54 may be eliminated. In such a case, the fasteners 10 would be adhered to one side 58 of the carrier material strip 52, and the roll 56 would be formed with the one side 58 of the strip 52 facing inwardly.

In use, the user unrolls the roll 56 as shown in FIG. 4, and peels the second carrier material strip 54 off of the fasteners 10 (peeling of the second strip 54 is of course unnecessary if it has been eliminated). The user then peels each releasable fastener 10 off of the first carrier material strip 52 as it is needed, by grasping and pulling on the front and back oppositely-facing, adhesive-free sides of a second portion 16 of a releasable fastener 10.

Once a number of fasteners 10 have been removed from the strip 52, the resulting empty portions of the strips 52 and 54 may be torn off and thrown away. If desired, the strips 52 and 54 may be made with perforated lines between each of the releasable fasteners to facilitate removal of the empty portions.

The releasable fastener dispenser 50 has the advantages, among others, that it stores a supply of releasable fasteners 10 in a compact manner, and that it allows a user to quickly and easily remove the fasteners 10 from the dispenser 50 without touching any adhesive. It is to be understood that, if desired, the strips 52, 54 need not be rolled into a roll, but may instead advantageously be left as a long strip, possibly with a stiff backing material mounted under the first strip 52. Also, the strips 52, 54 may be made wider, such that more than one fastener 10 is located across the width of the strips 52, 54.

The principles, preferred embodiments, and modes of operation of the present invention have been described in the foregoing specification. However, the invention which is intended to be protected is not to be construed as limited to the particular embodiments disclosed. The embodiments are therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

I claim:

1. A fastener for fastening together a plurality of sheets, comprising:
   a piece of base material, said base material piece including
   at least one interleaving portion having front and back oppositely-facing sides wherein at least a portion of said front and back sides are covered with an adhesive, and
   at least one cover portion connected to said interleaving portion and having front and back oppositely-facing sides, wherein at least a portion of said back side of said cover portion is covered with an adhesive and said front side of said cover portion being free of adhesive.

2. A fastener as claimed in claim 1, wherein said base material piece includes a plurality of interleaving portions identical to said at least one interleaving portion, a plurality of cover portions identical to said at least one cover portion, and a plurality of perforated lines extending across said base material piece.

3. A fastener as claimed in claim 2, wherein said plurality of perforated lines divides said base material piece into a plurality of patches, each of said patches includes a single one of said plurality of interleaving portions and a single one of said plurality of cover portions.

4. A fastener as claimed in claim 1, wherein said base material piece further includes at least one folding portion between said interleaving and cover portions, said folding portion including front and back oppositely-facing sides thereon which are free of adhesive.

5. A fastener as claimed in claim 1, wherein said base material piece further includes at least one first pull tab portion having front and back oppositely-facing sides thereon which are free of adhesive, said first pull tab portion extending from a first edge of said base material piece to said interleaving portion.

6. A fastener as claimed in claim 1, wherein said base material piece further includes at least one second pull tab portion having front and back oppositely-facing sides thereon which are free of adhesive, said second pull tab portion extending from a second edge of said base material piece to said cover portion.

7. A fastener as claimed in claim 1, wherein said base material is paper.

8. A fastener as claimed in claim 1, wherein said fastener is for releasably fastening at least two pieces of paper together, and wherein said adhesive on said front and back sides of said interleaving portion and said adhesive on said front side of said cover portion are more adherent to said base material than to the pieces of paper.

9. A releasable fastener for fastening together a plurality of pieces of paper, comprising:
   a base including
      interleaving means having front and back oppositely-facing sides wherein at least a portion of said front and back sides are covered with adhesive and for interleaving between the pieces of paper and releasably fastening the pieces of paper to said front and back sides; and
      covering means having front and back oppositely-facing sides, wherein at least a portion of said backside of said covering means is covered with an adhesive and said front side of said covering means being free of adhesive and connected to said interleaving means for covering and securing a portion of an outermost piece of the pieces of paper.

10. A releasable fastener as claimed in claim 9, wherein said base further includes spacing means for spacing said interleaving means from said covering means and wherein said spacing means includes at least one spacing portion having front and back oppositely-facing sides which are free of adhesive.

11. A releasable fastener as claimed in claim 9, wherein said base further includes fold facilitating means for facilitating folding of said base such that said interleaving means is locatable on one side of a piece of paper and said covering means is locatable on an opposite side of the piece of paper.

12. A releasable fastener as claimed in claim 9, wherein said base further includes first pull tab means for facilitating fastening and release of said interleaving means to and from pieces of paper, and second pull tab means for facilitating fastening and release of said covering portion to and from a piece of paper.

13. A releasable fastener as claimed in claim 12, wherein said first pull tab means includes at least one first pull tab portion of said base which is located between a first edge of said base and said interleaving means and which includes front and back oppositely-facing sides which are free of adhesive, and wherein said second pull tab means includes at least one second pull tab portion of said base which is located between said covering means and a second edge of said base and which includes front and back oppositely-facing sides which are free of adhesive.

14. A releasable fastener as claimed in claim 9, wherein said interleaving means includes a plurality of interleaving portions for interleaving between two pieces of paper and releasably fastening thereto, and wherein said covering means includes a plurality of cover portions for covering portions of an outermost piece of the pieces of paper.

15. A releasable fastener as claimed in claim 14, wherein said base includes a plurality of perforated lines thereacross which divide said base into a plurality of patches, each of said patches including a single one of said plurality of interleaving portions and a single one of said plurality of cover portions.

16. A releasable fastener for releasably fastening a plurality of pieces of paper together, comprising:
   a piece of base material divided into a plurality of patches by a plurality of perforated lines extending thereacross, each of said patches including a first edge and a second, opposite edge, and, in the following order between said first and said second edge, including
      a first pull tab portion including front and back oppositely-facing sides which are free of adhesive,
      an interleaving portion including front and back oppositely-facing sides wherein at least a portion of said front and back sides are covered with a releasable adhesive,
      a folding portion including front and back oppositely-facing sides which are free of adhesive,
      a cover portion including front and back oppositely-facing sides, wherein at least a portion of said back side of said cover portion is covered with a releasable adhesive and wherein said front side of said cover portion is free of adhesive, and
      a second pull tab portion including front and back oppositely-facing sides which are free of adhesive.

* * * * *